Oct. 15, 1946.　　　M. O. GLESSNER　　　2,409,270
HANDLING GRANULAR MATERIALS
Filed May 31, 1945　　　3 Sheets-Sheet 1
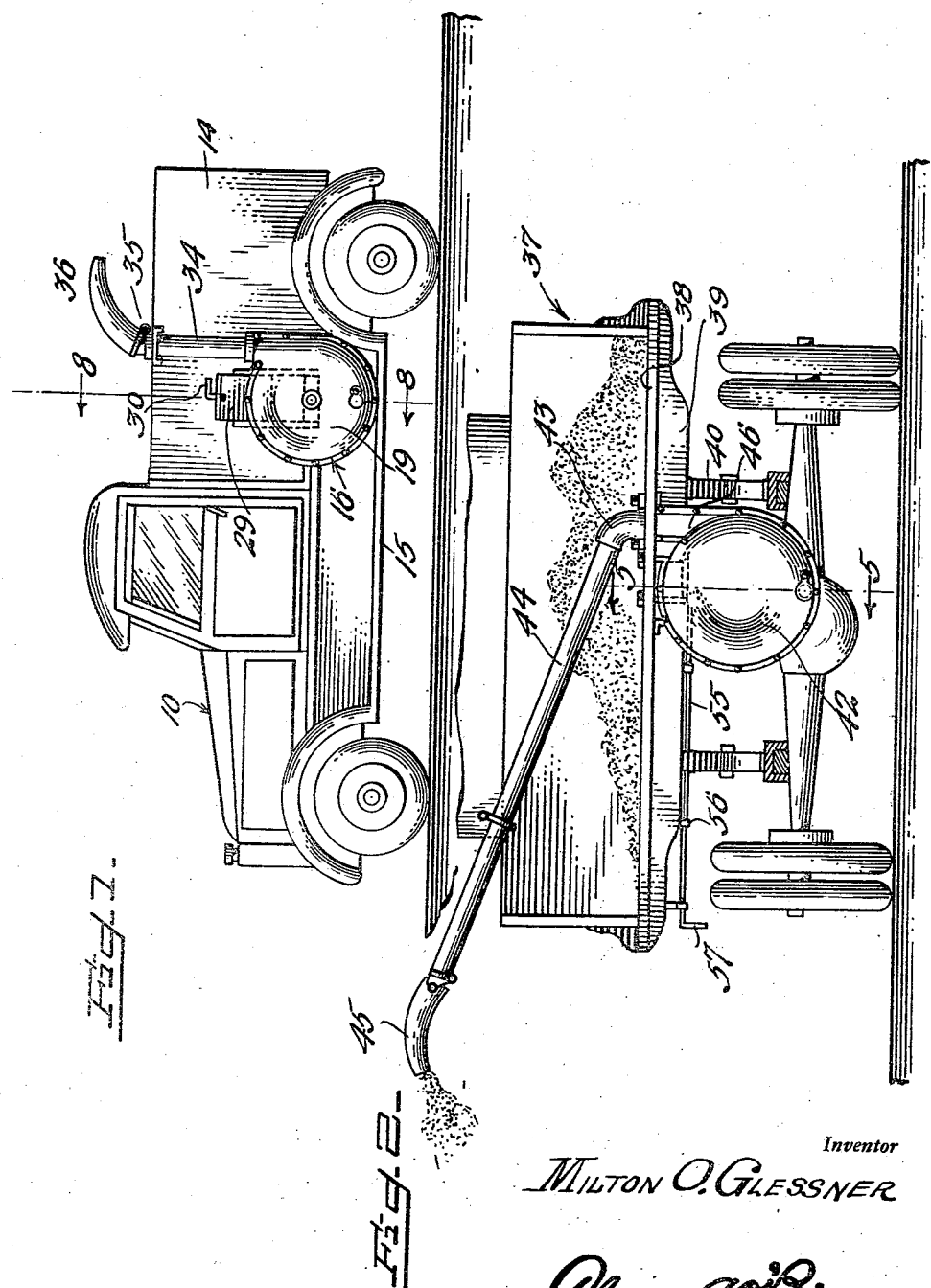
Inventor
MILTON O. GLESSNER
By Clarence A. O'Brien
and Harvey B. Jacobson
Attorneys

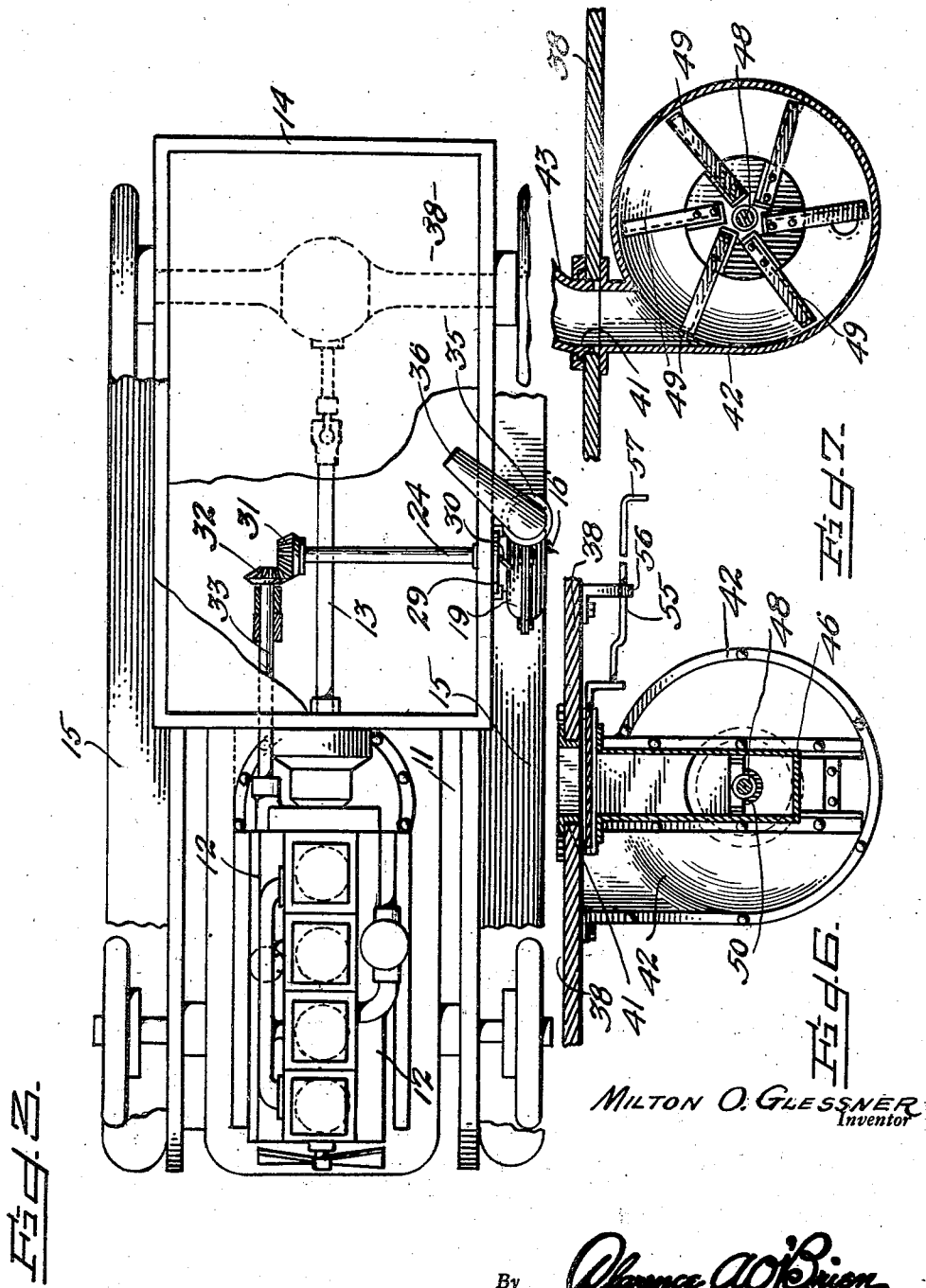

Oct. 15, 1946.  M. O. GLESSNER  2,409,270
HANDLING GRANULAR MATERIALS
Filed May 31, 1945   3 Sheets-Sheet 3
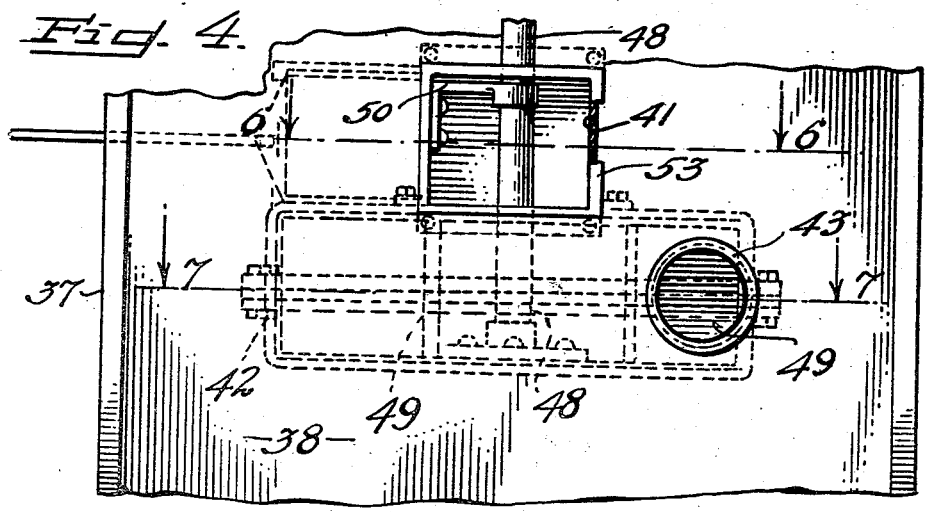
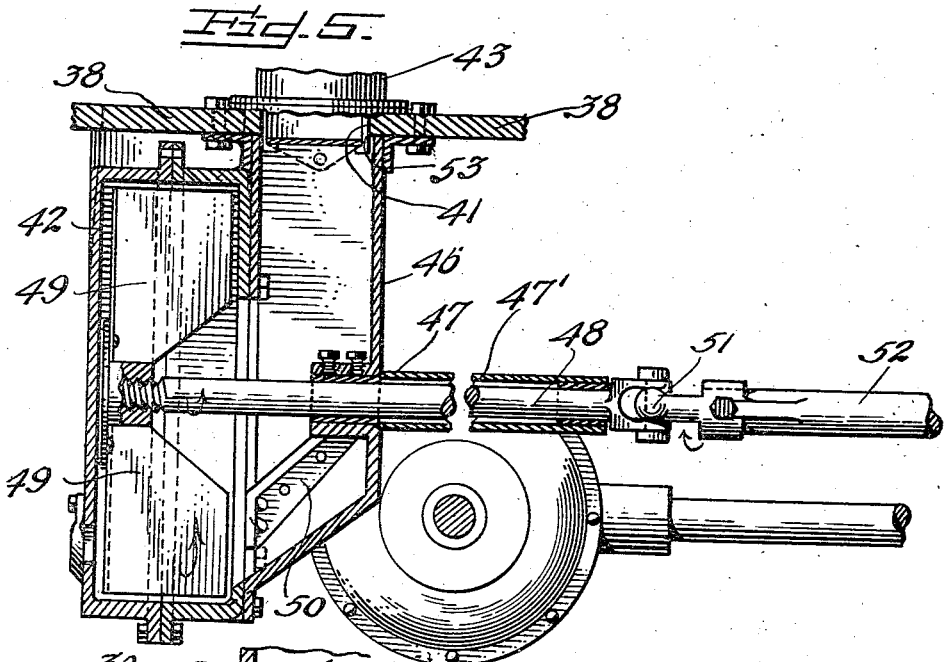
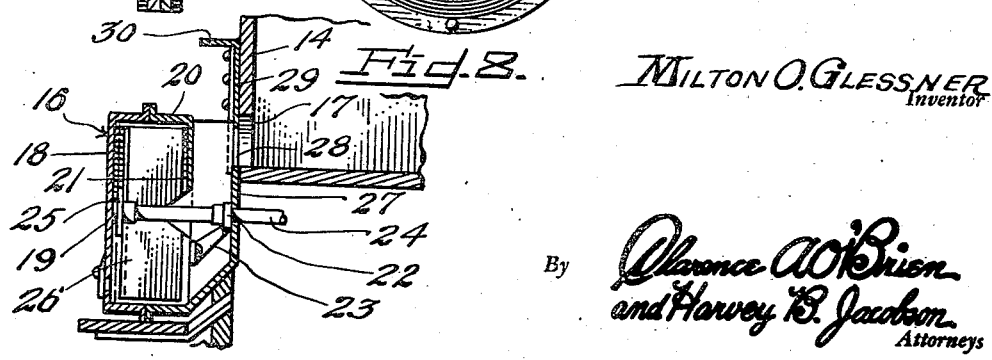
Milton O. Glessner
Inventor
By Clarence A. O'Brien
and Harvey B. Jacobson
Attorneys Patented Oct. 15, 1946

2,409,270

UNITED STATES PATENT OFFICE 2,409,270

HANDLING GRANULAR MATERIALS

Milton O. Glessner, Salina, Kans.

Application May 31, 1945, Serial No. 596,888

2 Claims. (Cl. 214—83)

This invention relates to handling granular materials, and more particularly to the transfer of grain from a wheeled vehicle to a point of storage or to another vehicle.

The object of the invention is to facilitate the complete discharge of granular material from the body of the vehicle and to reduce the amount of manual labor involved to a minimum.

Another object of the invention is to adapt an ordinary vehicle body to the handling of granular materials.

Among its features, my invention embodies a blower adapted to be mounted on a vehicle in such position that the granular material can be easily introduced into the blower and discharged from the discharge end thereof, an elevator swivelly connected to the discharge end of the blower, and a discharge spout at the end of the elevator by which the granular material passing thru the blower and elevator may be deposited at the desired point.

Other features embody means for connecting the blower fan to the power takeoff of an ordinary truck engine in order to supply the power for operating the fan.

Still other features embody a hand-controlled valve by means of which the entry of the granular material into the blower may be governed or completely arrested.

Rigid construction, a minimum of parts, accessibility for repair or inspection, clean out opening in case of clogging. Mounting is of a nature that the service of experts are not required.

The blower when mounted on a pick up type of truck is accessible, out of the way, can be left on the truck when not in use, minimizes the cutting of the truck bed to install, is above the running board and not subject to being damaged in passing over rough fields, ditches, etc.

Enclosed gears, insuring long life of the blower, minimizes the chance for accidents, and transmits power direct from the power takeoff driven by the truck engine eliminating chains or belts.

Rubber or plastic covered fan insures maximum of wear and minimizes chance for breakage, eliminates cracking of grain.

Built in such a manner that an attachment may be connected for picking grain up from the ground or loaded into a truck from a granary.

Flexible shafting may be used in place of gears.

The blower when mounted on a flat or grain bed truck is suspended beneath the floor in approximately the center of the bed, which allows a maximum amount of grain to be unloaded before it is necessary to push or shovel the grain over to the grain inlet opening, thereby saving labor and speeding up the unloading time.

Gears are eliminated when thus mounted and power is transmitted from the motor power take-off thru a shaft and universal joints direct to the blower.

In thus mounting the blower the truck can be dumped at the marketing point at the elevator without interfering.

No chance that the blower may be knocked off or damaged by high ridges, ditches, etc.

Easily mounted and removed. Simple in design, repairs easily made when necessary.

Construction of fan makes it possible to unload large amounts of grain and deliver it a great distance with a minimum amount of speed.

The direct drive makes for smooth running and sufficient operation.

In the drawings:

Figure 1 is a side view of a truck of one type equipped with my improved grain-handling apparatus, Figure 2 is a rear end view of a truck of another type showing my improved grain-handling apparatus attached thereto, Figure 3 is a top plan view of the truck illustrated in Figure 1, Figure 4 is a fragmentary top plan view of the truck illustrated in Figure 2, Figure 5 is a vertical sectional view taken on the line 5—5 of Figure 2, Figure 6 is a vertical sectional view taken on the line 6—6 of Figure 4, Figure 7 is a vertical sectional view taken on the line 7—7 of Figure 4, and Figure 8 is a vertical sectional view taken on the line 8—8 of Figure 1.

Referring to the drawings in detail, one type of truck, designated generally at 10, includes the customary supporting chassis 11, engine 12, drive shaft 13, and body 14. This truck is provided with the usual running boards 15, and mounted on one of said running boards is my improved unloading device, designated generally at 16. The side of the truck body 14 next to that on which the unloading device 16 is positioned is provided with an outlet opening 17 (Figure 8), the bottom wall of which is flush with the bottom of the truck body as shown.

The unloading device 16 previously referred to comprises a blower casing 18 comprising two halves 19 and 20 of substantially circular configuration, the half 19 being solid, whereas the half 20 is provided with an opening 21 through which the granular material to be unloaded from the truck is introduced into the blower casing 18. Mounted for rotation in a bearing 22 carried by a bracket 23 secured to the outer side of the casing 21 is a blower shaft 24 carrying, at its extreme end, a disk 25 to which impeller blades 26 are riveted or otherwise attached for rotation within the housing 18. Extending laterally from the casing half 20 toward the body 14 of the truck is a chute 27 having an opening 28 in its rear or side wall which aligns with the opening 17, and through which the granular material contained within the body 14 may be introduced into the chute. Slidably mounted in suitable guides at opposite sides of the opening 28 is a door 29 carrying, at its upper edge, an operating handle 30, by means of which it may be moved into various vertically adjusted positions with relation to the openings 17 and 28.

As shown in Figure 3, the shaft 24 extends transversely across the chassis 11 and is provided at its end opposite the one entering the blower 18 with a bevel pinion 31 which meshes with a bevel pinion 32 carried by a shaft 33 which is connected to the power takeoff equipment of the engine 12. It will thus be seen that the blower fan may be driven directly from the engine of the vehicle.

As illustrated in Figure 1, the outlet port of the blower 16 has swivelly connected thereto a vertically extending pipe or elevator 34 which has hinged at 35 to its upper end a discharge nozzle 36, through which the granular material being unloaded from the truck body 14 may be directed to the point desired.

In Figure 2, I have illustrated a modified form of my invention which is adapted for use on trucks of a larger size than that illustrated in Figure 1, and in this type of device the truck body, designated generally 37, comprising the usual side walls and bottom 38 which is supported on the customary bolsters 39, is mounted on a chassis 40.

Formed in the bottom 38 of the truck body 37 at a point slightly to the rear of the differential housing is an opening 41 which serves as the discharge opening through which the granular material contained within the truck body is introduced into the discharge mechanism to be more fully hereinafter described. Secured immediately below the bottom 38 of the truck body 37 is a blower 42, the discharge end of which projects upwardly through the truck body and has swivelly connected thereto an elbow 43 carrying an elevator tube 44 which terminates, at its upper end, in an adjustable discharge nozzle 45. Secured to the intake side of the blower 42 is a chute 46 which is formed, near its lower end, with a collar 47 into which one end of a drive shaft housing 47' is introduced. This housing carries at each end a bearing for a drive shaft 48 of the fan 49 contained within the housing 42. The collar 47 is further supported by a bracket 50 and the drive shaft 48 is coupled by means of a universal joint 51 to the power take-off shaft 52 of the truck engine. The upper end of the chute 46 communicates with the opening 41, and slidable transversely in a frame 53 secured in the opening 41 in the bottom 38 is a door 54 which is connected by means of a rod 55 mounted to slide in brackets 56 transversely of the truck with a handle 57, by means of which the door may be moved to various adjusted positions across the opening 41 in order to control the flow of granular material therethrough. It will thus be seen that the opening or closing of the chute 46 may be manually controlled from the side of the truck.

In operation, when it is desired to unload the truck, i. e., that illustrated in Figures 1, 4, 6 and 7, the slide rod 55 is moved laterally so as to withdraw the door from closing position over the opening 41, whereupon the granular material may be shoveled into the chute 46, and upon setting the fan 49 in motion, it will be evident that the granular material will be driven by the blower 42 up through the elbow 43 and elevator 44 out through the nozzle 45. Due to the swivel connection of the elbow 43 with the discharge opening of the blower, it is obvious that the elevator may be swung to various positions so as to discharge the granular material at the desired point.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what I claim as new is:

1. The combination with a self-propelled vehicle adapted to haul granular material comprising a wheel supported chassis, an engine carried by said chassis, a power takeoff carried by the engine, and a body mounted on said chassis for containing granular material during its transportation, said body having a discharge opening in its bottom to the rear of the drive axle of the vehicle, of means carried by said vehicle body for discharging the granular material therefrom comprising a blower, a chute supported by the vehicle body in alignment with the discharge opening for directing granular material from the body into the blower, a fan in the blower mounted for rotation about an axis which lies parallel with the longitudinal axis of the vehicle below the vehicle body, means connecting the fan with the power takeoff, an elevator swivelly connected to the discharge end of the blower for delivering the granular material to a predetermined point above the level of the vehicle body, and a slide valve disposed at the intake end of the chute for varying the width of the chute opening and the volume of granular material admitted to the blower.

2. The combination with a self-propelled vehicle comprising a wheel supported chassis, an engine carried by the chassis, means to effect driving connection between the engine and the rear wheels of the vehicle, a power take-off carried by the engine and a body on the chassis having a grain discharge opening in its bottom to the rear of the drive wheels of the vehicle, of means carried by the vehicle for discharging granular material therefrom comprising a chute attached to the body in alignment with the discharge opening, an elevator tube extending upwardly through the bottom of the body near the grain discharge opening, a blower carried by the chute to which granular material is delivered by the chute and from which the granular material is delivered to the elevator tube, drive means connecting the blower with the power take-off and a cover plate closing the rear side of the blower and accessible from the rear end of the vehicle to facilitate the making of repairs to the blower.

MILTON O. GLESSNER.